United States Patent [19]
Rushmore et al.

[11] Patent Number: 5,855,947
[45] Date of Patent: Jan. 5, 1999

[54] AROMATIZATION OF BEVERAGE POWDERS

[75] Inventors: Dean Frederick Rushmore, Marysville; Lawrence G. Carns, Plain City, both of Ohio

[73] Assignee: Nestec S.A., Vevey, Switzerland

[21] Appl. No.: 960,131

[22] Filed: Nov. 25, 1997

Related U.S. Application Data

[63] Continuation-in-part of Ser. No. 790,134, Jan. 29, 1997, abandoned.

[51] Int. Cl.$^6$ .................................. A23F 5/00; A23F 3/00
[52] U.S. Cl. .......................... 426/590; 426/594; 426/386; 426/388
[58] Field of Search ..................................... 426/285, 386, 426/594, 388, 453, 590

[56] References Cited

U.S. PATENT DOCUMENTS 2,077,819  4/1937  Zizinia ..................................... 426/285
3,148,070  9/1964  Mishkin et al. .............................. 99/71

*Primary Examiner*—Anthony J. Weier
*Attorney, Agent, or Firm*—Pennie & Edmonds LLP

[57] ABSTRACT

A process for incorporating an aroma-containing substrate into a beverage powder. The beverage powder is transported in the form of a moving bed and caused to fall in an annular curtain into a filler for filling the beverage powder into containers. As the beverage powder falls in the annular curtain, the aroma-containing substrate is sprayed onto the beverage powder from a position above the moving bed. This provides a substantially homogenous distribution of the aroma-containing substrate in the beverage powder in the filler.

20 Claims, 2 Drawing Sheets

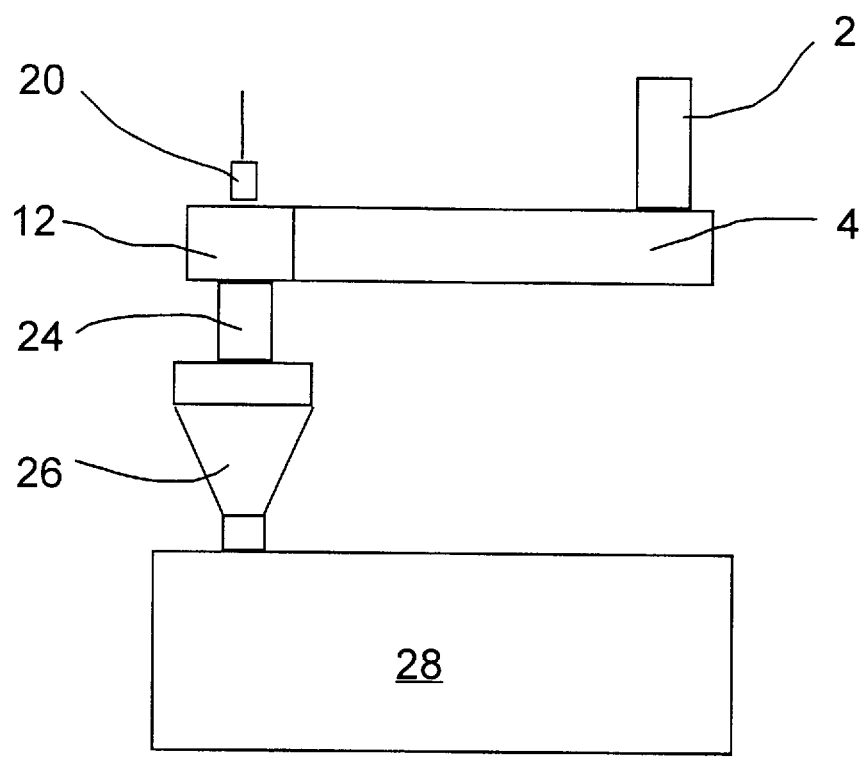

AROMATIZATION OF BEVERAGE POWDERS

CROSS-REFERENCE TO RELATED APPLICATION

This application is a continuation-in-part of application Ser. No. 08/790,134 which was filed on Jan. 29, 1997 now abandoned.

FIELD OF THE INVENTION

This invention relates to a process for the aromatization of beverage powders; for example soluble coffee powder. The invention also relates to the beverage powders so produced.

BACKGROUND TO THE INVENTION

Consumers associate certain aromas with certain products. If the product lacks the aroma associated with it, consumer perception of the product is adversely affected. This is particularly a problem in the field of soluble beverages such as soluble coffee powder, although it also exists in other fields. For ease of description, the problem is described in this specification primarily with reference to soluble coffee powder, although the invention is not limited to soluble coffee powders. It is equally applicable to other beverage powders such as roast and ground coffee powders, soluble tea powders, soluble creamer powders, cereal-based beverage powders, and soluble chocolate powders.

Soluble coffee powders which are obtained from commercial processes involving extraction, concentration and drying, are usually substantially aroma-less. For this reason, it is conventional to trap coffee aromas which are given off during the processing of the soluble coffee powder and to reincorporate these aromas into the soluble coffee powder.

Usually the aroma is reincorporated by first capturing the aroma into a substrate such as an oil or emulsion. The aroma-containing substrate is then sprayed or plated on the soluble coffee powder prior to handling and blending. The blended coffee powders are later filled into containers which are then sealed.

A typical procedure by which an aroma-containing substrate is sprayed on soluble coffee powder is described in U.S. Pat. No. 3,148,070 (Mishkin) and Sivetz, M. and Desrosier, N.W.; 1979; *Coffee Technology,* AVI Publishing Company, Inc.; Westport, Conn.; pages 459 and 460. In this procedure, soluble coffee powder falls down a supply tube and onto a conical distributor which causes the soluble coffee powder to continue its fall in the form of a tubular curtain. A spray nozzle is positioned beneath the conical distributor, within the tubular curtain, to spray an aroma-containing substrate on the inner surfaces of the tubular curtain. The tubular curtain of soluble coffee powder then drops into a blender where it is mixed to homogeneously distribute the aroma-containing substrate throughout the soluble coffee powder. The aromatized soluble coffee powder is then fed into a filler machine in which it is fed into jars or other containers.

In variations of this theme, the aroma-containing substrate is sprayed on falling sheet-like curtains of soluble coffee powder or is sprayed on soluble coffee powder in tumblers, or is sprayed on soluble coffee powders transported on conveyors. In all cases, the soluble coffee powder is then run through a blender or mixer to have the aroma-containing substrate blended homogeneously throughout the soluble coffee powder.

Although this basic procedure works well, significant amounts of aroma are lost during mixing or blending of the soluble coffee powder after spraying. Further, aroma is lost during the period between spraying and filling of the coffee into containers. Also, it is found that the force of the spray causes the aroma-containing substrate to pierce the tubular or sheet-like curtain of soluble coffee powder. This results in further losses. Aroma is an expensive component and these losses can significantly increase costs. Moreover, especially for the sheet-like curtains, it is found that the aroma-containing substrate contacts only about 15% to about 30% of the curtain leading to a coffee product which is not homogeneous.

One attempt to solve the wastage problem is described in U.S. Pat. No. 3,769,032 (Lubsen). Here coffee jars, which have already been filled with soluble coffee powder, are transported to beneath a mechanical syringe which contains coffee aroma. The syringe descends into each jar until the needle tip is near the bottom of the jar. The syringe then rises and at the same time injects droplets of coffee aroma into the coffee product in the jar. The droplets have a size of about 0.5 mm to 3 mm. Although the results reported in the patent indicate good re-incorporation of the coffee aroma, the system would not be not feasible in a high-speed production line. Also, the aroma-containing substrate is not distributed homogeneously throughout the soluble coffee powder in the jar. This is significant draw-back.

Another attempt is disclosed in U.S. Pat. No. 4,355,571 (Stoeckli). This patent discloses the use of an aromatizing apparatus in which an aroma-containing substrate is plated on soluble coffee powder. A small portion of the soluble coffee powder is directed to the aromatizing apparatus and falls down a chute onto a rotating wheel. The wheel has several circumferential grooves in its surface into which the soluble coffee powder is pressed. The soluble coffee powder is rotated with the wheel through an arc of about 90° after which it is expelled from the wheel. Needles are positioned immediately after the point of expulsion to inject a stream of an aroma-containing substrate on the soluble coffee powder expelled from the wheel. The aromatized soluble coffee powder is then returned to the major portion of the soluble coffee powder and blended in with the major portion. The blend is then fed to a filler machine in the usual manner.

Although the process described in this patent does not require spraying of the aroma-containing substrate, it does require blending after addition of the aroma-containing substrate. Due to the volatile nature of aroma, significant aroma losses still occur during blending and during the period between blending and filling of the coffee into containers. Also, precisely because there is no spraying, the soluble coffee powder contains large droplets of aroma-containing substrate and the aroma-containing substrate is poorly distributed.

Therefore there is still a need for a process of incorporating an aroma-containing substrate into beverage powder which results in relatively low losses of aroma.

SUMMARY OF THE INVENTION

Accordingly, in one aspect, this invention provides a process for incorporating an aroma-containing substrate into a beverage powder, the process comprising:

transporting the beverage powder in the form of a moving bed and causing the moving bed to fall in an annular curtain into a filler for filling the beverage powder into containers; and spraying the aroma-containing substrate onto the beverage powder as it falls in the annular curtain from a position above the moving bed for providing a substantially homogenous distribution of the aroma-containing substrate in the beverage powder in the filler.

It has been surprisingly discovered that it is possible to incorporate an aroma-containing substrate into beverage powder while the beverage powder is being discharged into a filling machine such that a substantially homogenous distribution of the aroma-containing substrate in the beverage powder is obtained. Previously, it had always been thought that the aromatized beverage powder needed to be mixed or blended to obtain a substantially homogenous distribution. It is also found that the process provides the advantage of significantly reduced aroma loss; for example it is found that up to about half the amount of aroma previously required is now needed to obtain the same aroma strength. In particular, it is found that the spraying of the aroma-containing substance from above the beverage powder does not result in the aroma-containing substance piercing the annular curtain of beverage powder. Further, it is found that the aromatized beverage powder has improved aroma characteristics.

Preferably the moving bed of beverage powder has a depth of about 0.005 m to about 0.05 m; for example about 0.01 m to about 0.025 m.

The beverage powder may be transported in the form of a moving bed by feeding the beverage powder into an elongated channel member and causing the channel to vibrate.

The moving bed of the beverage powder may be caused to fall in an annular curtain by transporting the bed over a substantially circular distribution aperture. Preferably the aroma-containing substrate is sprayed onto the beverage powder from a spray nozzle positioned coaxially above the distribution aperture.

In another aspect, this invention provides an aromatized beverage powder produced by the process defined above. Preferably the beverage powder is soluble coffee powder and the aroma-containing substrate is an aromatized coffee oil or emulsion.

BRIEF DESCRIPTION OF THE DRAWINGS

Embodiments of the invention are now described, by way of example only, with reference to the drawings in which:

FIG. 3 is a schematic diagram of an apparatus for aromatizing a beverage powder.

DETAILED DESCRIPTION OF PREFERRED EMBODIMENTS OF THE INVENTION

Figure 1:
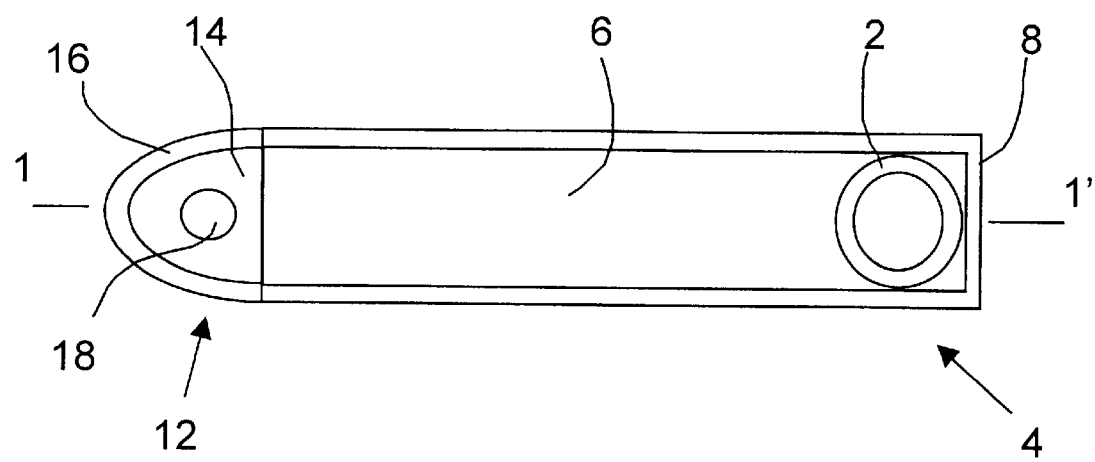
FIG. 1 is a top view of an apparatus for providing an annular curtain of beverage powder.
Figure 2:
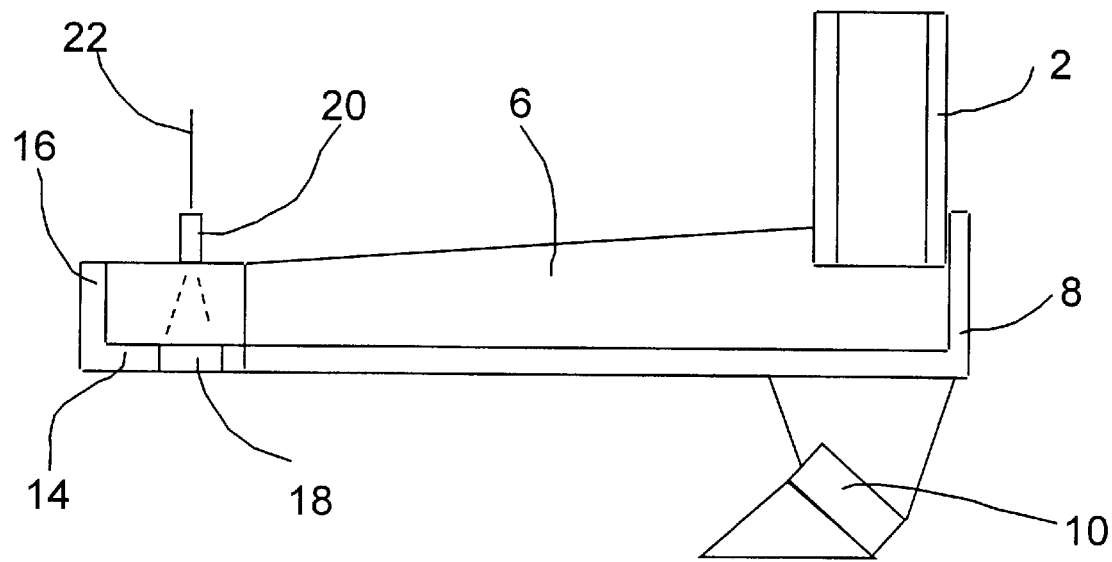
FIG. 2 is a cross-section along line 1–1' of FIG. 1.

The process requires a beverage powder to be aromatized by the spraying of an aromatized substrate onto the beverage powder prior to beverage powder being discharged into a filler for filling into containers. It will be appreciated that the process is applicable to many types of beverage powders; for example soluble coffee powders; powders formed of mixtures of soluble coffee, whiteners and sweeteners; soluble tea powders; soluble chocolate powders; soluble cereal-based beverage powders, roast and ground coffee powders, sauce bases, and the like. However, for simplicity, the process will be described in detail only with respect to soluble coffee powder.

For soluble coffee applications, the soluble coffee powder may be obtained from a suitable extraction, concentration and drying process. Suitable extraction, concentration and drying processes are well known. Freeze dried and spray dried powders may be used. The powders may be agglomerated prior to aromatisation but need not be.

Further, for soluble coffee applications, the aromatized substrate is suitably a coffee oil or an emulsion of a coffee oil and water, coffee extract or aroma distillate. The coffee oil which is used may be any desired coffee oil; for example coffee oil obtained from commercial sources or produced by extracting it from spent coffee grounds and the like using procedures which are well known in the art. For example, the coffee oil may be expelled from freshly roasted coffee beans using commercially available oil expellers. This technique and other suitable techniques for extracting coffee oil from coffee beans, are described in Sivetz (1979); pages 452 to 460. The source and the exact composition of the coffee oil used is not critical. Other edible oils may be used in full or partial replacement of coffee oil but this is not preferred for soluble coffee applications; particularly if the resulting product is to be considered pure coffee. However for mixtures or other products, other oils (such as rapeseed oil) may be preferable.

For soluble coffee applications, the aroma carried by the substrate is preferably coffee aroma. Conveniently, the coffee aroma is made up of natural coffee aroma gases. The coffee aroma gases may be collected at any of several points in the processing of coffee, for example gases evolved during roasting of green coffee ("roaster gases"), gases evolved during grinding of roasted whole beans ("grinder gases") and those evolved during infusion of ground roasted coffee ("infusion gases"). Preferably, the coffee aroma is used in the form of a cryogenically condensed, aroma frost which may be produced as described in U.S. Pat. No. 5,182,926; the disclosure of which is incorporated by reference. Of course, synthetic coffee aromas may also be used. Also, other desired aromas or flavors, for example vanilla, almond, chocolate, whisky, brandy, Irish creme, etc. may be used or included.

Referring now to the drawings, soluble powder is fed through a feed tube 2 onto a vibratory conveyor 4. The vibratory conveyor 4 is formed of a channel member 6 into which the soluble powder is fed. The end adjacent which the soluble powder is fed, is closed off by an end wall 8. A vibrating means 10 is positioned beneath the channel member 6 to cause the channel member 6 to vibrate. This in turn causes the soluble powder to flow towards the open end 12 of the channel member 6 in the form of a moving bed. The depth of the bed may be adjusted by suitably adjusting the depth of the feed tube 2 in the channel member 6, the rate of transport of the soluble powder in the channel member 6, and the like. The depth of the moving bed is suitably about 0.01 to about 0.02 m; for example about 0.013 m to about 0.016 m. Suitable vibratory conveyors are commercially available; for example from Eriez Magnetics, Erie, Pa. 16514, USA.

A powder distributor 12 is connected to the open end 12 of the vibratory conveyor 4. The powder distributor 12 is formed of a semi-circular floor plate 14 from which a circumferential retaining wall 16 extends upwardly. The floor plate 12 has a circular distribution aperture 18 cut through it. The bed of coffee powder entering the powder distributor 12 from the vibratory conveyor 4 falls through the distribution aperture 18 in the form of an annular curtain. If desired, the powder distributor 12 may be arranged to have the diameter of the distribution aperture 18 adjustable. The powder distributor 12 is preferably enclosed to prevent the ingress of oxygen and escape of aroma. If desired, the powder distributor 12 may be flushed with an inert gas to further reduce oxidation; for example nitrogen gas or carbon dioxide gas.

A spray nozzle 20 is positioned above the powder distributor 12; coaxially with the distribution aperture 18. An aroma-carrying substrate is sprayed through the spray nozzle 20 in a 360° pattern onto the bed of soluble powder as it falls through the distribution aperture 18 in the form of an annular curtain. The spray nozzle 20 may be any suitable nozzle which is able to break up an aroma-carrying substrate into droplets and spray the droplets into a suitable pattern; for example a conical pattern. A two fluid nozzle is particularly suitable. Suitable nozzles are commercially available and may be obtained, for example, from Spray Systems Inc. The aroma-carrying substrate is fed to the spray nozzle 20, through a feed line 22, using a pump (not shown). The pump preferably is able to continuously supply the aromatized substrate in metered amounts. Gear pumps, such as the Zenith (trade name) pumps obtainable from Parker Hannifin Corporation of Sanford, N.C., USA, are particularly suitable. However suitable centrifugal pumps or batteries of reciprocating pumps may also be used. It is preferred that the amount of aroma-carrying substrate supplied may be accurately controlled. If desired, the spray nozzle 20 may include suitable cleaning devices which are activated if the spray nozzle 20 becomes blocked. A suitable cut-off valve may be positioned between the pump and the spray nozzle 20 to prevent dripping when the pump is deactivated.

The rate at which the aroma-carrying substrate is sprayed onto the soluble powder is selected to provide the desired level of aromatization. The rate is preferably readily adjustable to take into account changes in the flow rate of soluble powder in the vibratory conveyor. The droplet size of the atomized aroma-carrying substrate is preferably in the range of about 1 $\mu$m to about 1 mm. Further, the loading of the aroma-containing substrate on the soluble coffee powder is preferably about 0.1% to about 0.5% by weight, for example about 0.2% to about 0.4% by weight.

The aromatized soluble powder falls through a discharge tube 24 into a feed hopper 26 of a filler 28. From the feed hopper 26, the aromatized soluble coffee powder falls into the filler 28 and is filled into suitable containers (not shown) in the usual manner. The aromatized soluble powder does not undergo any blending or mixing prior to being fed into the filler 28. The filler 28 may be any suitable filling machine. For example, for glass jars and cans, suitable filling machines are the Necoflo (trade name) series of filling machines supplied by John R. Nalbach Engineering Co, Inc.; of Chicago, Ill., USA. For sachets, suitable filling machines may be obtained from Klöckner-Bartelt, Jones Inc., Hayssen, etc. The containers into which the soluble beverage powder is filled may be any suitable containers; for example glass jars, tin cans, sachets, and the like.

It is surprisingly found that by forming the soluble powder into a moving bed, causing the moving bed to fall in an annular curtain, and then spraying an aroma-carrying substrate onto the soluble powder from above the bed, a substantially homogeneous distribution of the aroma-carrying substrate in the soluble powder is obtained. In consequence, a substantially homogeneous distribution of the aroma-carrying substrate in the soluble powder in the containers is obtained. This is important to ensure that consumers do not detect large differences in aroma between containers and within any container. Prior to this invention, the aromatized soluble powder has been subjected to mixing prior to being filled into containers in order to obtain a substantially homogeneous distribution.

Further, because the soluble powder is fed directly into the feed system of the filler after being aromatized, the residence time of the soluble powder prior to being filled into containers is relatively small. Therefore loss of volatile aroma components is substantially reduced. This reduces the amount of aroma that needs to be added per unit weight of soluble powder; often by as much as 50%. Also, because less of the volatile aroma components are lost, the soluble powder in the container has a much better aroma.

Moreover, it is found that spraying of the aroma-containing substrate from above the soluble coffee powder results in little or no piercing of the annular curtain by the aroma-containing substrate. This also reduces aroma loss.

It will be appreciated that numerous modifications and variations may be made to the embodiment described above without departing from the scope of the invention. For example, it is not necessary to use a vibratory conveyor to convey the soluble powder to a powder distributor. Any suitable means of providing a moving bed of powder in the powder distributor may be used. For example, the soluble beverage powder may be deposited on a rotating plate. The height of the bed of soluble beverage powder on the rotating plate may be controlled by preventing the soluble beverage powder from recirculating and by controlling the rate at which the soluble beverage powder is deposited onto the plate. Recirculation may be prevented by using suitable baffles. Centrifugal forces developed by the rotation of the plate convey the soluble beverage powder to a suitable distribution aperture adjacent the edge of the plate. The aromatized substrate may be sprayed onto the soluble beverage powder as is falls through the aperture.

A process example is now described to further illustrate the invention.

EXAMPLE 1

A freeze-dried, non-agglomerated soluble coffee powder is used. The soluble coffee powder is fed onto a vibratory conveyor at a rate of 1.66 kg/ minute. The vibratory conveyor is obtained from Eriez (Model 20A) has a channel length of about 0.5 m and a width of about 0.1 m. The depth of the bed of soluble coffee powder on the vibratory conveyor is maintained at about 1.3 to about 1.5 cm. The soluble coffee powder is fed from the vibratory conveyor to a powder distributor which contains a distribution aperture of 2.86 cm diameter.

A two-fluid nozzle obtained from Spray Systems Inc. (¼ JBC) is positioned coaxially above the distribution aperture. An aromatized coffee oil is sprayed through the nozzle at a flow rate of 5 g/minute in the form of a cone onto the soluble coffee powder as it falls through the distribution aperture in the form of an annular curtain. Atomizing gas is fed to the nozzle at a rate of 0.11 $m^3$/hr. The process is continued for one hour. The aromatized powder is collected.

Samples of the powder are dissolved in hot water and tasted by a panel. No differences in aroma or flavor are discernible between the samples indicating that the aroma is distributed substantially homogeneously throughout the soluble coffee powder.

EXAMPLE 2

The process of example 1 is repeated except that 6.6 g/minute of an aroma emulsion containing equal amounts of aqueous and oil phase is sprayed onto the soluble coffee powder. No problems with the formation of lumps and fines arise. Also, the aroma is distributed substantially homogeneously throughout the soluble coffee powder.

EXAMPLE 3

The process of example 1 is repeated for a duration of 3 hours using a flow rate of spray-dried soluble coffee powder of 1.64 kg/minute. No lumping or formation of fines is noticed and the aroma is distributed substantially homogeneously throughout the soluble coffee powder.

EXAMPLE 4

The process of example 1 is repeated using soluble coffee powder at a flow rate of 1.8 kg/minute. An aroma emulsion containing equal amounts of aqueous and oil phase is sprayed onto the soluble coffee powder at a rate of 11.5 g/minute. The process is continued for 8 hours. No lumping or formation of fines is noticed and the aroma is distributed substantially homogeneously throughout the soluble coffee powder.

EXAMPLE 5

A freeze-dried, non-agglomerated soluble coffee powder is used. The soluble coffee powder is fed onto a vibratory conveyor (Eriez Model 20A) at a rate of 2.27 kg/ minute. The depth of the bed of soluble coffee powder on the vibratory conveyor is maintained at about 1.6 cm. The soluble coffee powder is fed from the vibratory conveyor to a powder distributor which contains a distribution aperture of about 3 cm diameter. The vibratory conveyor is covered and purged with nitrogen gas.

A two-fluid nozzle obtained from Spray Systems Inc. (¼ JBC) is positioned coaxially above the distribution aperture. An aromatized coffee oil is sprayed through the nozzle at a flow rate of 6.8 g/minute in the form of a cone onto the soluble coffee powder as it falls through the distribution aperture in the form of an annular curtain. Atomizing gas is fed to the nozzle at a rate of 0.11 to 0.16 $m^3$/hr.

The aromatized powder is fed directly into a sachet filling machine (Klöckner-Bartelt) in which the powder is filled into sachets of 17 g capacity at a rate of about 120 sachets per minute. The process is continued for several hours. No build up of oil or lump formation is detected.

Samples of soluble coffee powder are carefully removed from different positions in several sachets and are analyzed for oil content. The oil content is substantially the same at different positions in each sachet and between the sachets. This indicates good homogeneity. Further, the headspace of several sachets is subjected to a gas chromatograph analysis to determine aroma levels. The levels are a little higher than those in control sachets produced by the traditional process which involves blending. However, twice as much aromatized oil is used in the traditional process indicating that the process of this example provides a considerable saving in aroma.

A sachet is also used to produce 8 cups of coffee. The coffee is visually inspected and found to contain no large droplets of oil on their surfaces. Further, the coffee has a good aroma with roasty notes.

EXAMPLE 6

The process of example 1 is repeated except that the soluble coffee powder is sprayed with either:
 i) 5 to 15 g per minute of a liquid carrier containing vanilla flavor; or
 ii) 5 to 15 g per minute of a liquid carrier containing hazelnut flavor.

In both cases, the flavorant is distributed uniformly thoughout the soluble coffee powder.

EXAMPLE 7

The process of example 1 is repeated except that soluble tea powder is fed on the conveyor and 5 to 15 g per minute of a liquid carrier containing lemon flavor is sprayed onto the tea powder. The flavorant is distributed uniformly thoughout the soluble tea powder.

EXAMPLE 8

The process of example 1 is repeated except that non-dairy creamer powder is fed on the conveyor and 5 to 15 g per minute of a liquid carrier containing French vanilla flavor is sprayed onto non-dairy powder. The flavorant is distributed uniformly thoughout the non-dairy creamer powder.

EXAMPLE 9

The process of example 1 is repeated except that instant cocoa powder is fed on the conveyor. Further, 1 to 15 g per minute of either of:
 i) a liquid cocoa aroma is sprayed onto the cocoa powder; or
 ii) 0.1 to 15 g per minute of lecithin, a wetting agent, is sprayed onto the powder. The flavorant or lecithin is distributed uniformly thoughout the cocoa powder.

EXAMPLE 10

The process of example 1 is repeated except that powdered instant sauce base is fed on the conveyor and 1 to 15 g per minute of chicken aroma/flavor is sprayed onto the powder. The flavorant is distributed uniformly thoughout the base.

EXAMPLE 11

The process of example 1 is repeated except that 20 kg/minute of soluble coffee powder is fed using a Vibra-Maschine D-6050 feeder, and 30 to 60 g/minute of a coffee aroma emulsion containing equal amounts of aqueous and oil phase is sprayed onto the coffee powder.

The aroma is distributed uniformly thoughout the soluble coffee powder. A teaspoon of the powder is dissolved in 150 ml of hot water. The coffee beverage produced is visually inspected and found to contain no large droplets of oil on its surface. Further, the coffee beverage has a good aroma with roasty notes.

We claim:

1. A process for incorporating an aroma-containing substrate into a beverage powder, the process comprising:
 transporting the beverage powder in the form of a moving bed and causing the moving bed to fall in an annular curtain into a filler for filling the beverage powder into containers; and
 spraying the aroma-containing substrate onto the beverage powder as it falls in the annular curtain from a position above the moving bed for providing a substantially homogenous distribution of the aroma-containing substrate in the beverage powder in the filler.

2. A process according to claim 1 in which the moving bed of beverage powder has a depth of about 0.005 m to about 0.05 m.

3. A process according to claim 2 in which the moving bed of beverage powder has a depth of about 0.01 m to about 0.025 m.

4. A process according to claim 1 in which the beverage powder is transported in the form of a moving bed by feeding the beverage powder into an elongated channel member and causing the channel member to vibrate.

5. A process according to claim 1 in which the moving bed of the beverage powder is caused to fall in an annular curtain by transporting the bed over a substantially circular distribution aperture.

6. A process according to claim 5 in which the aroma-containing substrate is sprayed onto the beverage powder from a spray nozzle positioned coaxially above the distribution aperture.

7. A process according to claim 6 in which the aroma-containing substrate is sprayed onto the beverage powder in a 360° pattern.

8. A process according to claim 1 in which the aroma-containing substrate is sprayed in the form of droplets having a size of about 1 μm to about 1 mm.

9. A process according to claim 1 in which the beverage powder is soluble coffee powder and the aroma-containing substrate is an aromatized coffee oil or emulsion.

10. A process for incorporating an aroma-containing substrate into a beverage powder, the process comprising:

transporting the beverage powder in the form of a moving bed by feeding the beverage powder into an elongated channel member and causing the channel member to vibrate;

causing the moving bed to fall in an annular curtain directly into a filler for filling the beverage powder into containers, by transporting the bed over a substantially circular distribution aperture; and spraying the aroma-containing substrate onto the beverage powder as it falls in the annular curtain from a position above the moving bed for providing a substantially homogenous distribution of the aroma-containing substrate in the beverage powder in the filler.

11. A process according to claim 10 in which the moving bed of beverage powder has a depth of about 0.005 m to about 0.05 m.

12. A process according to claim 11 in which the moving bed of beverage powder has a depth of about 0.01 m to about 0.025 m.

13. A process according to claim 10 in which the aroma-containing substrate is sprayed onto the beverage powder from a spray nozzle positioned coaxially above the distribution aperture.

14. A process according to claim 13 in which the aroma-containing substrate is sprayed onto the beverage powder in a 360° pattern.

15. A process according to claim 10 in which the aroma-containing substrate is sprayed in the form of droplets having a size of about 1 μm to about 1 mm.

16. A process according to claim 10 in which the beverage powder is soluble coffee powder and the aroma-containing substrate is an aromatized coffee oil or emulsion.

17. A process for incorporating an aroma-containing substrate into a beverage powder, the process comprising:

transporting the beverage powder in the form of a moving bed and causing the moving bed to fall in an annular curtain; and spraying the aroma-containing substrate onto the beverage powder as it falls in the annular curtain from a position above the moving bed for providing a substantially homogenous distribution of the aroma-containing substrate in the beverage powder; and collecting the annular curtain in a filler for filling the beverage powder into containers.

18. A process according to claim 17 in which the moving bed of beverage powder has a depth of about 0.005 m to about 0.05 m.

19. A process according to claim 17 in which the beverage powder is transported in the form of a moving bed by feeding the beverage powder into an elongated channel member and causing the channel member to vibrate.

20. A process according to claim 5 in which the aroma-containing substrate is sprayed onto the beverage powder from a spray nozzle positioned coaxially above the distribution aperture.

* * * * *